Mar. 27, 1923.
R. H. BROWN.
GASOLINE LINE LOCK FOR CARS.
FILED MAR. 14, 1922.
1,449,378.
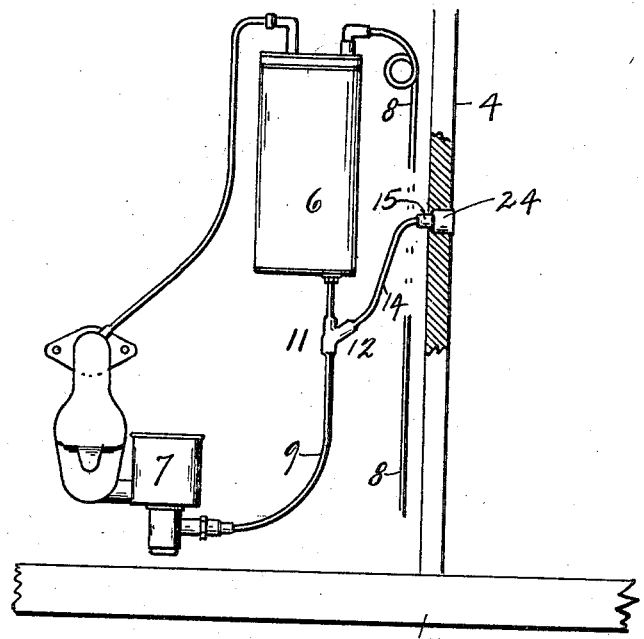
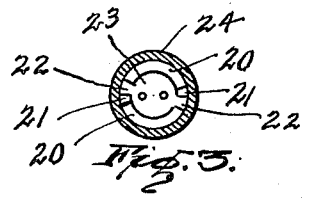
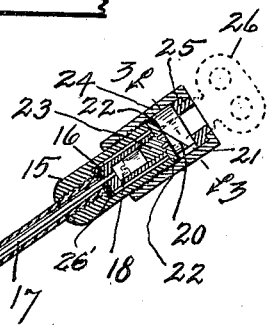
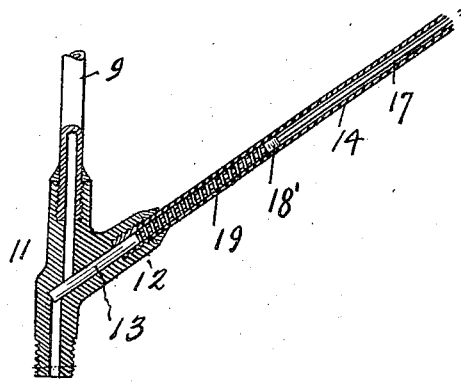
Inventor,
Richard H. Brown,
By
Joseph A. Minturn,
Attorney.

Patented Mar. 27, 1923.

1,449,378

UNITED STATES PATENT OFFICE.

RICHARD H. BROWN, OF INDIANAPOLIS, INDIANA.

GASOLINE-LINE LOCK FOR CARS.

Application filed March 14, 1922. Serial No. 543,693.

*To all whom it may concern:*

Be it known that I, RICHARD H. BROWN, a citizen of the United States, residing at Indianapolis, in the county of Marion and State of Indiana, have invented new and useful Improvements in Gasoline-Line Locks for Cars, of which the following is a specification.

The object of this invention is to provide means, operated from the dash or other convenient portion of a car, for cutting off the supply of gasoline between the vacuum tank and carburetor to prevent the theft of the car or its unauthorized use during periods when the authorized operator of the car leaves it for any purpose.

I accomplish the above, and other objects which will hereinafter appear, by the mechanism illustrated in the accompanying drawing, in which—

Fig. 1, is a view in side elevation and partial vertical section of a dash, chassis-frame, vacuum tank and carburetor, with my invention installed. Fig. 2, is a longitudinal section of my invention, and Fig. 3, is a cross section on the line 3—3 of Fig. 2.

Like characters of reference indicate like parts in the several views of the drawing.

The dash 4, chassis-frame 5, vacuum tank 6, and carburetor 7, are of any usual and suitable construction. A gasoline supply pipe 8 extends from the tank 6 to a gasoline storage tank of usual construction (not shown), and the tank 6 is connected by the usual pipe 9 with the carburetor. It is into this pipe 9 that my gasoline cut-off is preferably introduced, as shown in Fig. 1, although it may be connected with some other part of the gas supply system, as for example, with the pipe 8, in a manner not shown, but which will be obvious to anyone skilled in the art. The pipe 9 is cut in two at a convenient point, preferably near the tank 6, and the ends are secured in any substantial manner to a connecting member 11, and the joints are preferably sealed with solder, or otherwise, to prevent easy disconnection. The member 11 has a lateral branch 12 with a passageway joining one that is formed longitudinally in the member 11. The latter is offset at its junction with the passageway through branch 12, forming a seat for a valve 13. A tube 14 is attached to the outer end of branch 12, and terminates at its other end within a member 15 which has a socket extending in from its outer end, in which a cylindrical head 16 is seated. A socket in the head has a reduced opening at the bottom of the socket through which a rod 17 is passed. The rod 17 has a head 18 which is seated in the bottom of the socket, and the other end of the rod is attached to the valve 13 whereby, by moving the head 16 outwardly of member 15, the valve 13 will be drawn out of its seat, thereby opening the gas passage from tank 6 to the carburetor. A block 18 is fastened in the tube 14, through which the rod 17 slides freely, and a spring 19 wrapped around the rod 17 presses against the block 18 at one end and against the valve 13 at the other to normally seat the valve.

The outer end of the member 15 has diametrically opposite cams 20, and stops 21 at their highest parts, and on these cams rest the radial lugs 22 of a plug 23, which plug screws into and closes the socket in the head 16. By a half rotation of the plug 23, the travel of the lugs 22 on the cams 20 pulls on the rod 17 and draws the attached valve 13 out of its seat against the pressure of the spring 19. Screwed on the outer end of the member 15 is a sleeve 24 which is partially closed by a rotatable keeper 25 having a slot through which a key 26 (shown in dotted lines in Fig. 2) is inserted. The end of the key has pins which engage corresponding holes in the plug 23, and by such engagement provide means for rotating the plug and moving the connected mechanism to open the valve 13. The action of the spring through the rod 17 seats the head 16 against the bottom of the socket in the member 15, and the leakage of gasoline which generally passes valve 13 and fills the tube 14, is prevented by a washer 26'. The gasoline in tube 14 keeps the rod 17, spring and valve 13 lubricated and free to move freely and insures the practical movement of the valve when the rod is bent in its assembly, as is shown in Fig. 1.

When a car equipped with this device is left by its operator the key is withdrawn and the mechanism is so designed that the key can only be removed when the valve 13 is in its closed position.

Having thus fully described my invention, what I claim as new and wish to secure by Letters Patent is—

1. The combination, with the gasoline circulatory system of an internal combustion engine, of a pipe leading from said system, a valve at the junction of the system and pipe, a spring in the pipe normally seating the valve, a rod connected with the valve to operate it by a longitudinal pull on the rod means for flooding the pipe with gasoline to lubricate the rod and spring, and key-manipulated means for moving the rod against the action of the spring to open the valve.

2. The combination, with the gasoline circulatory system of an internal combustion engine, of a pipe leading from said system, a valve at the junction of the system and pipe, a spring in the pipe normally seating the valve, a rod connected with the valve to operate it by a longitudinal pull on the rod, a cam-operated means for longitudinally pulling the rod, a seal in the pipe near the cam-operated means to prevent escape of gasoline from the pipe, and key-manipulated means for actuating the cam means.

3. The combination, with the gasoline circulatory system of an internal combustion engine, of a pipe leading from said system, a valve at the junction of the system and pipe, a spring in the pipe normally seating the valve, a tube terminating with a member having a socket and cam-shaped end, a hollow head movable within the socket having members engaging the cams on the first member, a rod connected with the valve at one end having a head at the other end seated in the hollow of the first head, a seal in the pipe near the cam operated means to prevent escape of gasoline from the pipe, and a removable key to move the hollow head members against the cams to unseat the valve.

Signed at Indianapolis, Indiana, this the 8th day of March, 1922.

RICHARD H. BROWN.